US011981043B2

(12) United States Patent
Ayub

(10) Patent No.: US 11,981,043 B2
(45) Date of Patent: May 14, 2024

(54) CUTTING DEVICE FOR CUTTING LABELS FROM A WEB OF LABELLING MATERIAL

(71) Applicant: SIDEL PARTICIPATIONS, Octeville-sur-Mer (FR)

(72) Inventor: Salman Ayub, Mantova (IT)

(73) Assignee: SIDEL PARTICIPATIONS

( * ) Notice: Subject to any disclaimer, the term of this patent is extended or adjusted under 35 U.S.C. 154(b) by 0 days.

(21) Appl. No.: 17/780,094

(22) PCT Filed: Dec. 5, 2019

(86) PCT No.: PCT/EP2019/083828
§ 371 (c)(1),
(2) Date: May 26, 2022

(87) PCT Pub. No.: WO2021/110271
PCT Pub. Date: Jun. 10, 2021

(65) Prior Publication Data

US 2022/0297329 A1 Sep. 22, 2022

(51) Int. Cl.
*B26D 1/40* (2006.01)
*B65C 9/18* (2006.01)

(52) U.S. Cl.
CPC ............ *B26D 1/405* (2013.01); *B65C 9/1819* (2013.01); *B65C 2009/1834* (2013.01)

(58) Field of Classification Search
CPC ........ B26D 7/18; B26D 1/405; B65C 9/1803; B65C 9/1819; B65C 2009/1834; B65C 2009/1857

(Continued)

(56) References Cited

U.S. PATENT DOCUMENTS 6,050,927 A * 4/2000 Harrod ...................... B26F 1/20 83/306
2002/0129687 A1* 9/2002 Eckstein ................ B26D 7/018 83/100

(Continued)

FOREIGN PATENT DOCUMENTS

DE 10351877 A1 6/2005
DE 102006051359 A1 4/2008

(Continued)

OTHER PUBLICATIONS

International search report dated Sep. 1, 2020.

*Primary Examiner* — Nhat Chieu Q Do

(57) ABSTRACT

A cutting device for cutting labels from a web of labelling material. The cutting device includes a first member rotatable having a blade and rotatable about a first axis, a second member rotatable about a second axis, and a cutting station. The second rotary member having a receiving portion to receive the blade, advancing the receiving portion around the second axis, and supporting the web. At the cutting station, the blade engages the receiving portion to cut the web covering one at a time the receiving portion. The second rotary member includes a first portion extending at a first distance from the second axis and comprising the receiving portion, and a second portion angularly spaced from the first portion and extending at a second distance from the second axis. The blade faces the first angular portion and the second angular portion alternately to one another.

17 Claims, 6 Drawing Sheets

(58) Field of Classification Search
USPC .......................................................... 83/278
See application file for complete search history.

(56) References Cited

U.S. PATENT DOCUMENTS

| | | | | |
|---|---|---|---|---|
| 2010/0006233 | A1* | 1/2010 | Deckert | B65C 9/1819 156/510 |
| 2012/0318111 | A1* | 12/2012 | Yamamoto | A61F 13/15764 83/100 |
| 2017/0239830 | A1* | 8/2017 | Adami | B26D 7/265 |
| 2017/0369197 | A1* | 12/2017 | Carmichael | B65C 9/1819 |

FOREIGN PATENT DOCUMENTS

| | | | | |
|---|---|---|---|---|
| DE | 102013215999 | A1 * | 2/2015 | B26D 1/405 |
| DE | 102013215999 | A1 | 2/2015 | |
| WO | WO-9723398 | A1 * | 7/1997 | B26D 1/626 |

* cited by examiner

CUTTING DEVICE FOR CUTTING LABELS FROM A WEB OF LABELLING MATERIAL

TECHNICAL FIELD

The present invention relates to a cutting device, in particular to a device of cutting, preferably of sequentially cutting, labels from a web of labelling material, in particular labels configured to be applied onto articles in an automated labelling process, for example containers adapted to contain a pourable product, preferably a pourable food product.

BACKGROUND ART

Labelling machines configured to treat a labelling material in an automated labelling process are known and commonly used to prepare, transport and apply labels onto articles, in particular bottles, containers, jars, flacons, or the like, made of glass, plastic or metal, adapted to contain a pourable product, preferably a pourable food product.

Particularly widespread is the use of the so-called "glued labels", obtained starting from a web of labelling material initially wound around one or more storage reels.

In detail, the web is cut into equal sized portions to which a predetermined amount of glue is applied by means of gluing devices, for example rollers, spray systems, injection systems, or the like. The labels so obtained are then transferred and applied onto the outer lateral surfaces of the respective articles.

Particularly widespread are also labels of the tubular kind, known as "sleeve labels" and obtained starting from a web of heat-shrinking film wound around one or more storage reels; the sleeve labels are applied with a certain clearance on the respective articles and then heated in an oven to obtain their shrinking and perfect adhesion to the lateral surfaces of the articles themselves. These types of labels do not require the use of glue.

Regardless of the type of label used, a labelling machine typically comprises:

- a carousel rotatable about a central axis, preferably a vertical axis, and configured to convey a plurality of successive articles along an arc-shaped horizontal path;
- an inlet station, at which the articles to be labelled are fed to the carousel;
- an outlet station, at which the labelled articles exit the carousel; and
  - one or more labelling modules arranged peripherally relative to the carousel and configured to feed a respective plurality of labels to the carousel itself at an application station, in order to apply such labels to the respective articles.

Generally, a typical labelling module comprises:

- one or more storage units, normally rotatable rollers, around which corresponding reels of labelling material, in the shape of a continuous strip, are wound;
- a plurality of unwinding rollers that support, in use, the web of labelling material unwound from the respective reel and guide it along a feeding path; and
- a label transfer device, for example a known vacuum drum, configured to receive each label and feed such label to the carousel at the application station.

Typically, the labelling module further comprises a label cutting device configured to cut (i.e. to separate or part), in particular to sequentially cut, the labels from the relative web of labelling material which is unwound, in use, from the respective reel.

The label cutting device usually comprises a blade member, for example a knife, configured to cut, at a cutting station, a sequence of individual labels having the same length from the web of labelling material.

The label cutting devices typically used in the labelling modules of the above-mentioned type are of the rotary type. In detail, they comprise:

- a first rotary element, usually a blade member support roller ("blade roller"), rotatably mounted about a vertical axis, carrying the blade member and configured to convey the blade member along a circular cutting path around the above-mentioned axis; and
- a second rotary element, usually a counter-roller defining, in use, a counterblade element for the blade member ("counterblade roller"), rotatably mounted about an axis normally parallel to the axis of the first rotary element, arranged peripherally to the first rotary element, so as to be substantially tangential to the cutting path, and configured to support the web of labelling material and convey it towards the cutting station, at which the web is cut by the blade member.

In other words, the second rotary element defines, in use, an abutment for the blade member and a support roller for the web to be cut by the blade member itself.

In practice, the web is interposed, in use and at the cutting station, between the blade roller and the counterblade roller, the latter sequentially acting as an abutment roller, namely as an "anvil", for the blade member during the cutting.

More precisely, the blade member, rotationally conveyed along the cutting path, cooperates in contact with the web to be cut at the cutting station, completing the cutting process by going into abutment against an abutment lateral surface of the counterblade roller, sequentially.

In the case in which labels that envisage the use of glue are used, the labelling module further comprises at least one gluing roller configured to spread the glue on at least the end portions of each individual label, after the cutting and prior to their application to the relative articles.

Although being functionally valid, the label cutting devices of the above-mentioned type are still open for further improvement.

In particular, the need is felt in the industry to reduce the size of the known label cutting devices. Furthermore, the need is also felt in the industry to produce longer labels limiting, at the same time, an increase in the size of the known label cutting devices.

DISCLOSURE OF INVENTION

It is therefore an object of the present invention to provide a label cutting device which is designed to meet at least one of the above-mentioned needs in a straightforward and low-cost manner.

This object is achieved by a label cutting device as claimed in claim 1.

BRIEF DESCRIPTION OF THE DRAWINGS

Non-limiting embodiments of the present invention will be described by way of example with reference to the accompanying drawings, in which.

BEST MODE FOR CARRYING OUT THE INVENTION

Figure 1:
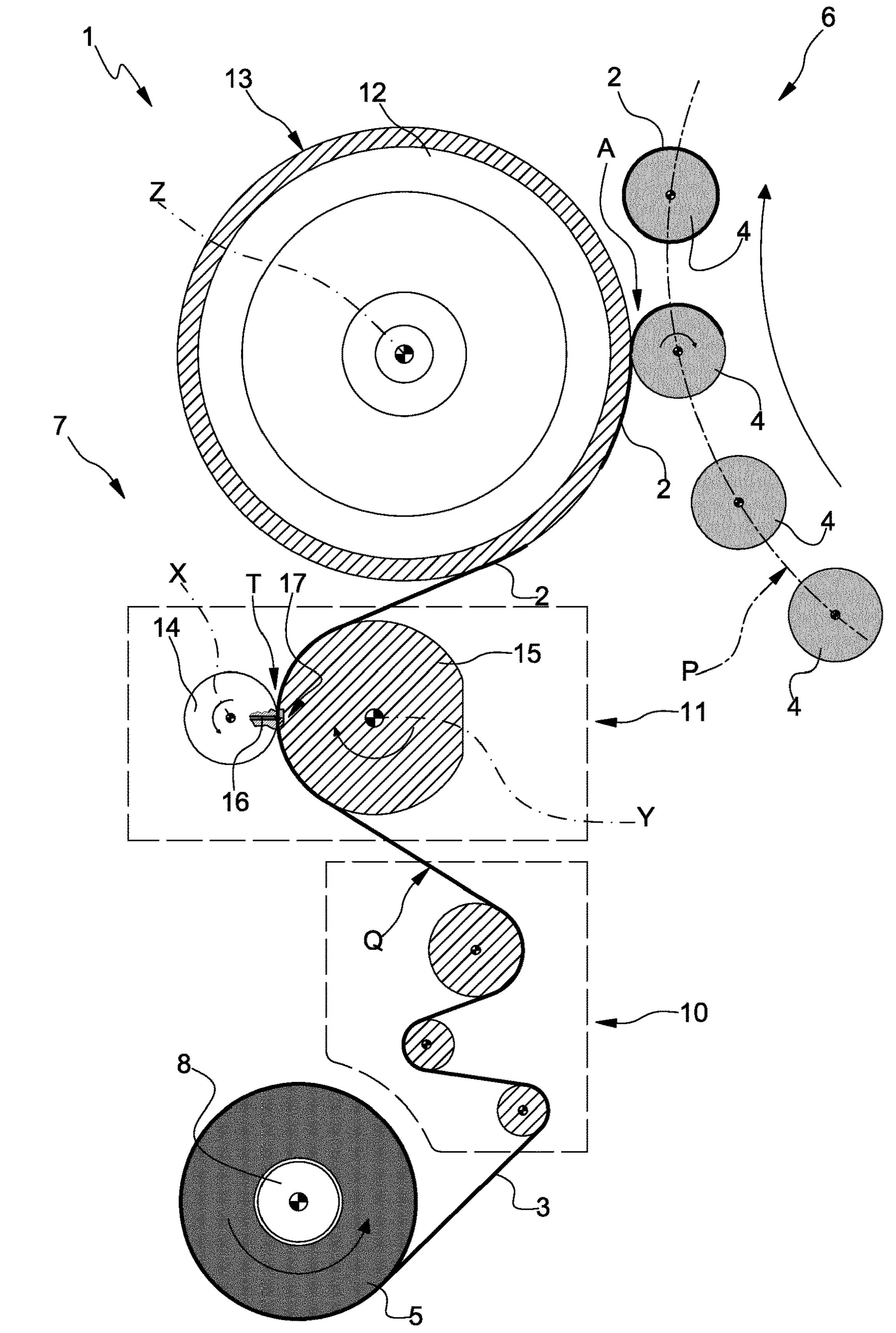
FIG. 1 is a partially sectioned, schematic top view, with parts removed for clarity, of a labelling machine comprising a label cutting device according to a preferred embodiment of the present invention.

With reference to FIG. 1, number 1 indicates as a whole a labelling machine configured to process a labelling material in an automated labelling process.

In particular, machine 1 is configured to apply labels 2, obtained from a web 3 of labelling material, onto articles 4 adapted to contain a pourable product, preferably a pourable food product.

In this non-limiting example, articles 4 are defined by bottles, flacons, cans, jars or the like, each one of which is adapted to receive, during the above-mentioned labelling process, a respective label 2 on its relative outer lateral surface.

According to the preferred embodiment shown, labels 2 are of the type known as "glued labels", namely labels 2 obtained starting from web 3, which is initially wound around one or more reels 5 (only one shown in FIG. 1) and is subsequently cut into equal sized portions to which the glue is then applied, by means of gluing means (known per se and not shown nor described in detail), such as a gluing roller. Labels 2 thus obtained are then transferred and applied (glued) to the outer lateral surfaces of the respective articles 4.

As shown in FIG. 1, machine 1 comprises:

- a carousel 6 rotatable around an axis (not shown), preferably a vertical axis, configured to convey a plurality of successive articles 4 along a path P, preferably horizontal and arc-shaped; and
- at least one labelling module 7 arranged peripherally relative to carousel 6 and configured to prepare, transport and feed a plurality of labels 2 to the carousel 6 itself, in order to apply them to respective articles 4 at an application station A.

According to an alternative embodiment not shown, machine 1 could comprise two or more labelling modules 7 configured to apply respective pluralities of labels 2 to relative articles 4 at respective application stations A.

In detail, labelling module 7 comprises:

- at least one support shaft 8 mounted to a fixed frame (not shown) of labelling module 7 and rotatably supporting, in use, at least the above-mentioned reel 5;
- a distribution system 10, for example a plurality of unwinding rollers mounted on the frame of the labelling module 7, configured to unwind web 3 from the reel 5 and to support, guide and/or advance web 3 along a preferably horizontal feeding path Q;
- a label cutting device 11 configured to cut (i.e. to separate), in particular to sequentially cut, labels 2 from web 3; and
- a transfer device, for example a vacuum drum 12 (known per se and not described in detail) configured to receive labels 2, previously parted from web 3 by cutting device 11, and to feed said labels 2 to carousel 6 at the application station A, for their application to the respective articles 4.

In greater detail, vacuum drum 12 (schematically illustrated in FIG. 1) is mounted on the frame of labelling module 7, in a rotatable manner around an axis Z, preferably vertical and parallel to the carousel axis, and is configured to receive labels 2, to hold them on an outer lateral surface 13 thereof by means of suction, according to a manner known and not described in detail, and to transfer them to relative articles 4 after a rotation of a predetermined angle around axis Z.

The cutting device 11 comprises a blade element, for example a knife or a blade 16, configured to cut a sequence of individual labels 2 having the same length from web 3 of labelling material.

Figure 2A:
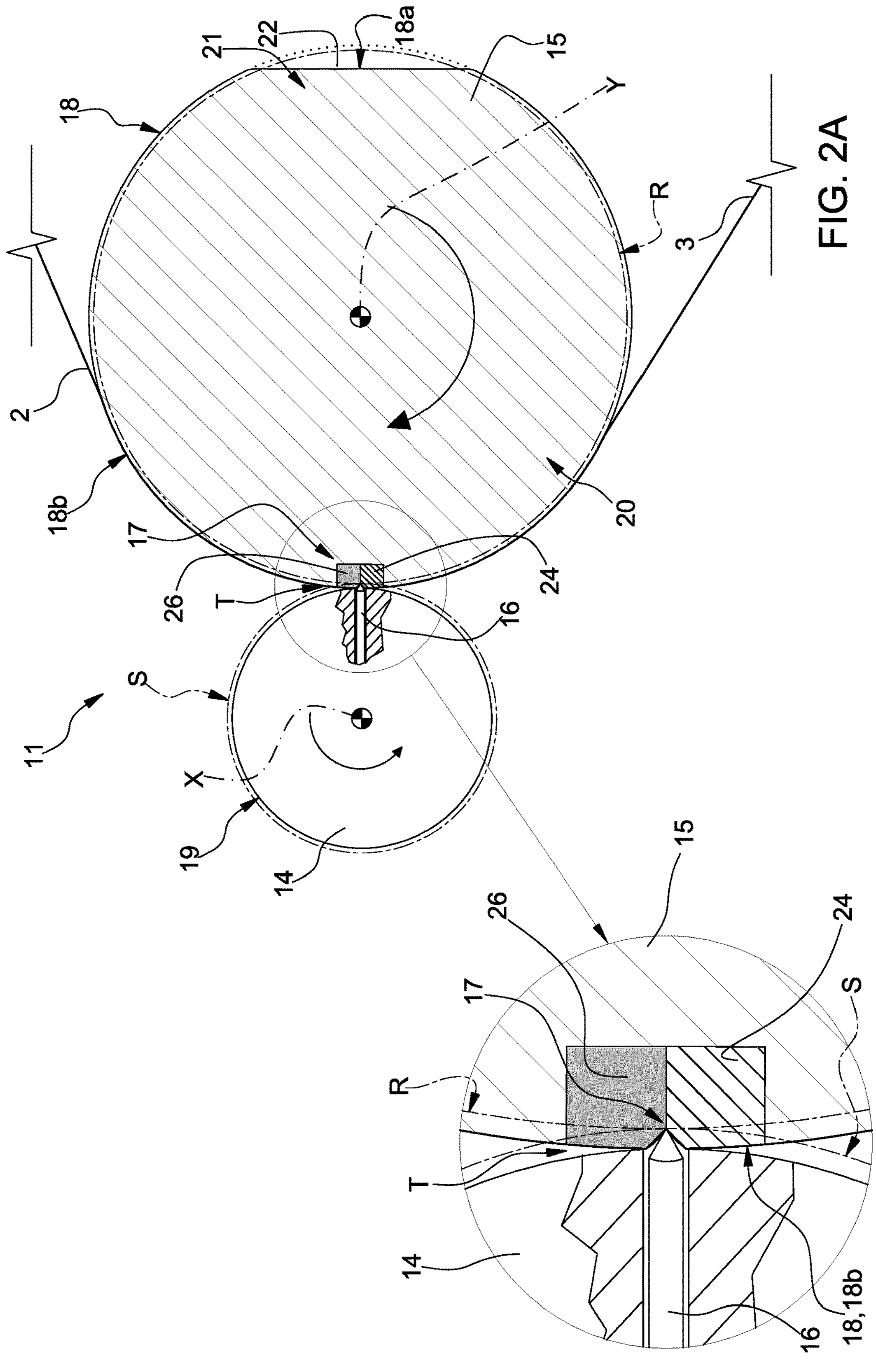
FIGS. 2a-2b are larger-scale, partially sectioned, schematic top views, with parts removed for clarity, of the label cutting device of FIG. 1 during different operating conditions.
Figure 2B:
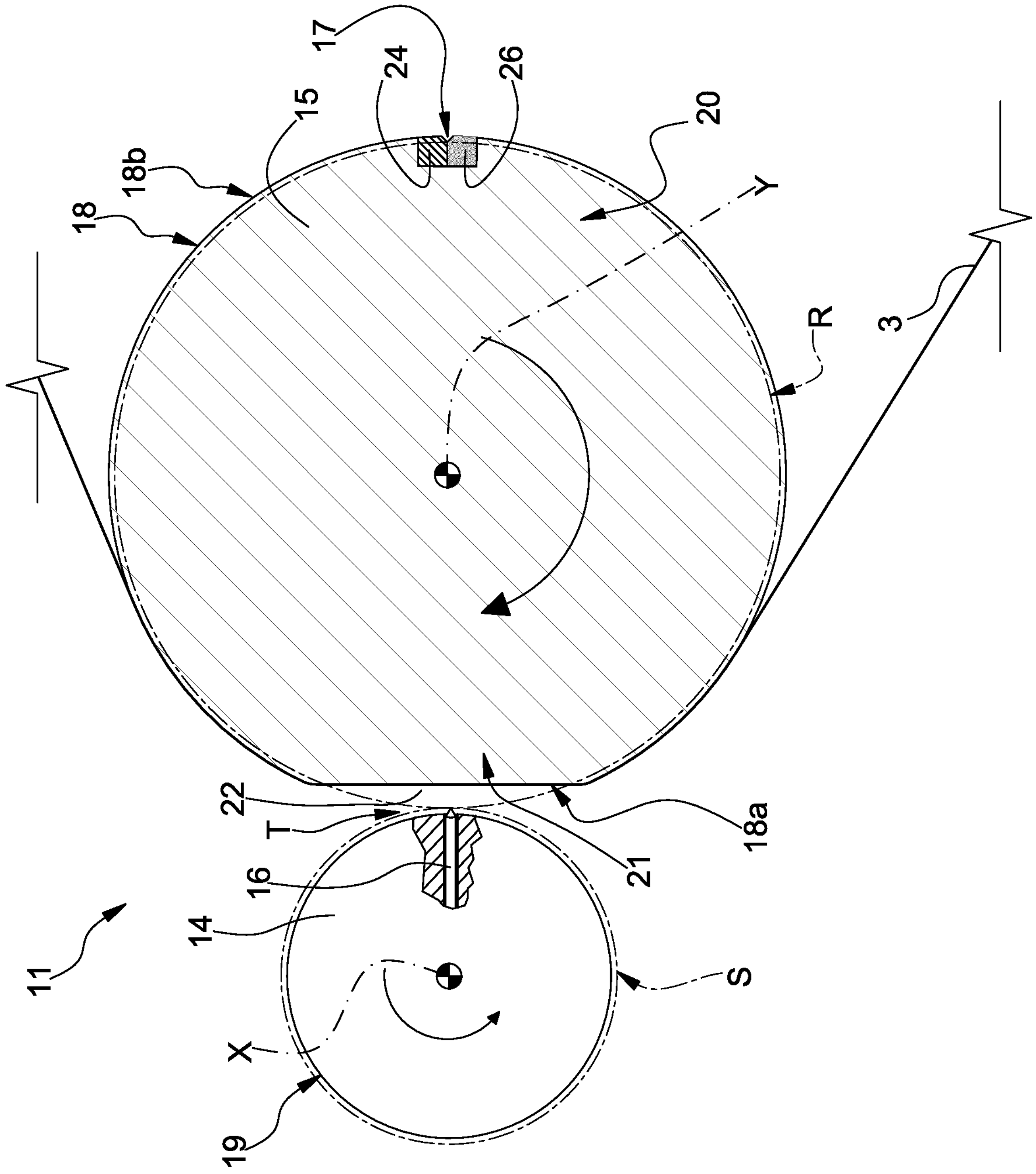

In detail, as illustrated in FIGS. 2a and 2b, cutting device 11 is of the rotary type and basically comprises:

- a first rotary member, in particular a blade support roller 14 rotatable around an axis X, preferably vertical, in particular mounted on the frame of labelling module 7 in a rotatable manner around axis X, carrying (in particular comprising) blade 16 and configured to advance blade 16 around axis X; and
- a second rotary element, for example a counterblade support roller 15, rotatable around an axis Y, preferably vertical, in particular mounted on the frame of labelling module in a rotatable manner around axis Y, having a receiving portion, in particular a slot obtained on its outer lateral surface 18 and configured to cyclically receive blade 16, advancing, in use, slot 17 around axis Y and supporting, in use, web 3 on outer lateral surface 18; and
- a cutting station T at which blade 16 engages, cyclically and in use, slot 17 to cut web 3 at predetermined cutting portions thereof covering one at a time the slot 17 itself.

More precisely, counterblade roller 15 is arranged peripherally to, in particular adjacent to (i.e. laterally to), blade roller 14.

Therefore, cutting station T is interposed between blade roller 14 and counterblade roller 15 along a line joining axis X and axis Y and, therefore, web 3 is interposed, in use during its advancement along the feeding path Q and at the cutting station T, between blade roller 14 and counterblade roller 15.

Counterblade roller 15 is configured to advance slot 17 along an annular path R extending around axis Y in a closed-loop manner.

Similarly, blade roller 14 is configured to advance blade 16 along an annular path S extending around axis X in a closed-loop manner.

More specifically, path S is defined by the path followed by a tip portion of blade 16 during advancement of blade 16 by means of blade roller 14, i.e. a free end portion of blade 16.

Similarly, path R is defined by the path followed by a bottom portion, i.e. the radially innermost portion relative to axis Y, of slot 17 during advancement of slot 17 by means of counterblade roller 15.

In the example shown, path R and path S are circular. Hence, blade roller 14 carries, in use, blade 16 at a fixed radial distance axis X and counterblade roller 15 carries, in use, slot 17 at a fixed radial distance from axis Y.

Conveniently, path S and path R are substantially tangent to one another at cutting station T. In this way, it is ensured that blade 16 engages, in use, slot 17, thereby cutting through the cutting portion of web 3 and separating the respective label 2 from the web 3 itself.

It is stated that the expression "substantially tangent" hereby encompasses both the case in which path S and path R are geometrically tangent and the case in which path S and path R are not tangent in the purely geometrical meaning of the word, having nonetheless a tangency such to ensure the appropriate physical interaction between blade 16 and slot 17 for properly cutting web 3, and/or taking into account the geometric tolerances of such components.

In light of the above, counterblade roller 15, and in particular slot 17, defines a counterblade body (or "anvil") for abutment of blade 16 at cutting station T.

Alternatively, blade 16 could engage slot 17 without abutting at the above-mentioned bottom portion of this latter.

As visible in FIGS. 1, 2*a* and 2*b*, blade roller 14 has a substantially cylindrical shape. Hence, blade roller 14 comprises a substantially cylindrical outer lateral surface 19.

Similarly, counterblade roller 15 has a substantially cylindrical shape. Hence, its outer lateral surface 18 is substantially cylindrical.

Conveniently, the radial distance between axis Y and slot 17, in particular between axis Y and path R, is greater than the radial distance between axis X and blade 16, in particular between axis X and path S.

More precisely, given the above-mentioned cylindrical shapes, blade roller 14 has a radius smaller than the radius of counterblade roller 15.

In the preferred embodiment shown, the radial distance between axis Y and slot 17 is two times larger than the radial distance between axis X and blade 16.

Conveniently, blade roller 14 and counterblade roller 15 are controllable, for example by means of a known control unit and known actuator means, so that the peripheral velocity of blade 16, relative to axis X, is substantially equal to the peripheral velocity of slot 17, relative to axis Y, at least at cutting station T.

In this way, homokinetic cutting conditions at cutting station T are provided, which ensure a clean and neat cutting of web 3.

In particular, blade roller 14 and counterblade roller 15 are controllable so that the peripheral velocity of blade 16 along path S, preferably along the entire path S, is substantially equal to the peripheral velocity of slot 17 along path R, preferably along the entire path R.

In other words, blade roller 14 and counterblade roller 15 preferably have, in use, substantially the same peripheral velocity.

Hence, in this case, given that the radial distance between axis Y and slot 17 is two times larger than the radial distance between axis X and blade 16, blade roller 14 is configured to rotate at an angular velocity double of the angular velocity counterblade roller 15 is configured to rotate at.

In light of the above, blade 16 is configured to complete two revolutions around axis X for each single revolution of slot 17 around axis Y.

According to an alternative non-shown embodiment, the radial distance between axis Y and slot 17 could be any multiple of the radial distance between axis X and blade 16 and, accordingly, the angular velocity of blade roller 14 could be any multiple of the angular velocity of counterblade roller 15, according to the inversely proportional well-known formula $v=\overline{\omega}\times r$, where v is the peripheral velocity, r is the radial distance, and $\overline{\omega}$ is the angular velocity.

It is stated that the expression "substantially equal" encompasses herein both the case in which the two peripheral velocities are exactly equal to one another and the case in which the two peripheral velocities are almost equal to one another, except for the normal tolerances of the components involved. For example, the peripheral velocity of blade roller 14 may be 95% to 105% of the peripheral velocity of counterblade roller 15, or vice-versa.

According to an aspect of the present invention, counterblade roller 15 comprises:

- a first angular portion 20 comprising slot 17 and extending at a first radial distance from axis Y; and
- a second angular portion 21 angularly spaced from first portion 20 and extending at a second radial distance from axis Y, the first distance being greater than the second distance.

Furthermore, according to a further aspect of the present invention, blade 16 is configured to face, cyclically and at cutting station T, first portion 20 and second portion 21 alternately to one another.

In practice, due to the fact that the radial distance between axis Y and slot 17 (i.e. between axis Y and path R) is greater than the radial distance between axis X and blade 16 (i.e. between axis X and path S), and due to the fact that the peripheral velocities of blade roller 14 and counterblade roller 15 are equal to one another, blade 16 faces, in use and at cutting station T, first portion 20 and then second portion 21 before facing again first portion 20.

This occurs because, in use, blade 16 completes more than one revolution around axis X for each revolution completed by slot 17 around axis Y, relative to cutting station T.

In the specific embodiment shown, blade 16 completes, in use, two revolutions around axis X for each revolution completed by slot 17 around axis Y, relative to cutting station T. In a first revolution, blade 16 faces, at cutting station T, slot 17, i.e. first portion 20; in a subsequent revolution, blade 16 faces second portion 21.

According to this non-limiting preferred embodiment shown, second portion 21 has an outer lateral surface 18*a*, defining an angular portion of outer lateral surface 18, arranged at a position radially more internal than path R, relative to axis Y.

In other words, outer lateral surface 18*a* is arranged in a position radially more internal than an outer lateral surface 18*b* of first portion 20, this latter surface defining the remaining portion of outer lateral surface 18.

More in particular, counterblade roller 15 comprises a recess 22, having its outer lateral surface 18*a* arranged in a position radially more internal than outer lateral surface 18, relative to axis Y, the recess 22 defining second portion 21.

In light of the above, at cutting station T, outer lateral surface 18*a* of recess 22 is arranged at a non-zero radial distance from path S.

According to this non-limiting embodiment shown, given that blade roller 14 has, in use, an angular velocity double of the angular velocity of counterblade roller 15 and therefore, given that blade 16 is configured to complete two revolutions around axis X for each single revolution of slot 17 around axis Y, recess 22 and slot 17 are accordingly arranged at diametrically opposite peripheral positions of counterblade roller 15, relative to axis Y.

Hence, in use and for each cycle, i.e. for each revolution of slot 17 around axis Y, blade 16 engages slot 17 at cutting station T (FIG. 2*a*) and then, at its next revolution around axis X, faces recess 22, thereby avoiding contact between blade 16 and outer lateral surface 18 of counterblade roller 15 (FIG. 2*b*).

Thanks to this solution, blade roller 14 can have a smaller size than counterblade roller 15 while still allowing the production of labels 2 of the predetermined length.

Moreover, if longer labels 2 need to be produced, is sufficient to appropriately increase the size of counterblade roller 15, so that the circumference defined by path R corresponds to the desired length of each label 2, while preferably maintaining the size of blade roller 14 unchanged and providing a number of second portions 21, or of recesses 22, equal to the number of times blade 16 passes from cutting station T without engaging slot 17, for each revolution of slot 17 around axis Y.

It is stated that since the tip portion of blade 16 slightly protrudes radially from an outer lateral surface 19 of blade roller 14, path S is radially more external than outer lateral surface 19 of blade roller 14.

Similarly, since the bottom portion of slot 17 extends slightly radially inward from outer lateral surface 18, path R is radially more internal than outer lateral surface 18*b*.

Figure 3:
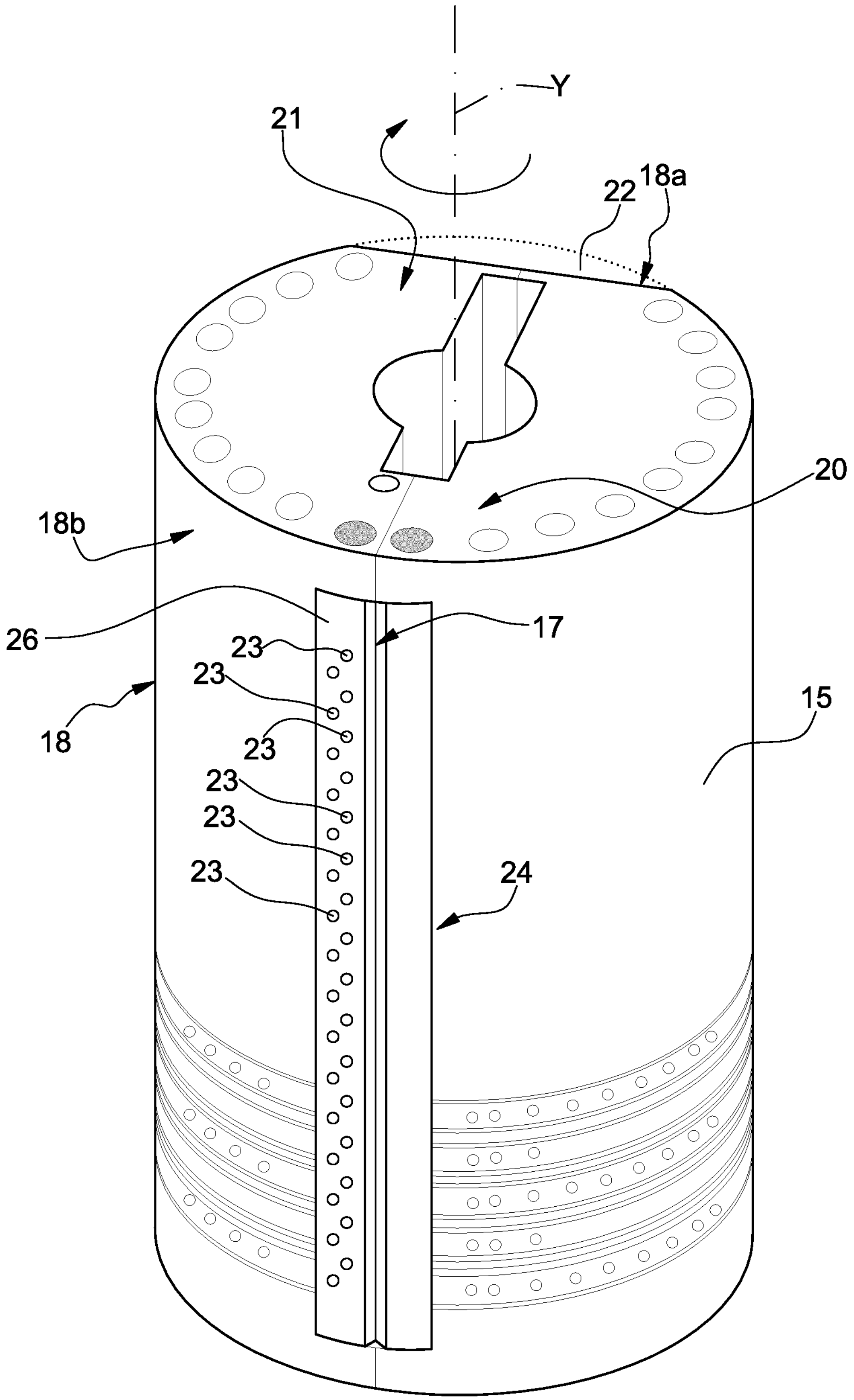
FIG. 3 is a larger-scale perspective view, with parts removed for clarity, of a detail of the label cutting device of FIG. 1.

As visible in FIGS. 2*a* and 2*b*, and in particular in FIG. 3, counterblade roller 15 further comprises suction means arranged at outer lateral surface 18 downstream of slot 17, with respect to the direction of rotation of counterblade roller 15 about axis Y.

In particular, suction means comprise a vacuum suction device 26 including a plurality of vacuum ports 23, connected in a known manner to a vacuum source, more preferably an external vacuum source, such as a vacuum pump.

Vacuum device 26 is cyclically activable, downstream of cutting station T, so as to retain, in use, a portion of the label 2 cut at cutting station T by blade 16.

More specifically, vacuum device 26 is arranged adjacent to slot 17 and is, therefore, configured to retain during cutting, by means of suction applied through vacuum ports 23, an end portion of the label 2 cut by blade 16 at cutting station T. Opportunely, vacuum ports 23 are arranged flush with outer lateral surface 18.

In this way, a free and uncontrolled flapping of each label 2, and in particular of the end portion of each label 2, after cutting is avoided.

Accordingly, once the majority of label 2 has been transferred to vacuum drum 12, vacuum device is deactivated, so that the end portion of label 2 can be released and transferred to the vacuum drum 12 itself.

Preferably, counterblade roller 15 further comprises a friction element, in particular a friction plate 24 arranged at outer lateral surface 18, preferably upstream of slot 17 with respect to the direction of rotation of counterblade roller 15 about axis Y.

Conveniently, friction plate 24 is arranged adjacent to slot 17 and flush with outer lateral surface 18.

In one embodiment, friction plate 24 could also be provided on vacuum device 26, thereby defining the outer lateral surface of vacuum device 26.

In another embodiment, friction plate 24 could only be provided on vacuum device 26.

Moreover, friction plate 24 has a friction coefficient higher than the friction coefficient of outer lateral surface 18. In particular, friction plate has a surface coating with a friction coefficient higher than the friction coefficient of outer lateral surface 18.

Friction plate 24 is therefore configured to at least limit, preferably preventing, a sliding of web 3 along outer lateral surface 18 during cutting of web 3 at cutting station T. Such sliding can occur, for example, due to the deformation web 3 is subjected to during pre-cutting under the action of blade 16.

Furthermore, thanks to friction plate 24, web 3 is more stretched and the cutting more neat and clean.

The operation of cutting device 11 is described hereinafter with reference to a single article 4 to be labelled and starting from a condition in which a predetermined cutting portion of web 3 is approaching cutting station T.

In this condition, blade roller 14 has advanced blade 16 almost at cutting station T and counterblade roller 15 has advanced slot 17 almost at cutting station T.

Then, blade 16, slot 17 and the predetermined cutting portion of web 3 reach together cutting station T, where path S is tangent to path R, and blade 16, which protrudes radially from outer lateral surface 19, engages slot 17, thereby cutting web 3.

At substantially the same time, vacuum device 26 is activated.

Subsequently, due to the fact that the radial distance between axis Y and slot 17 (i.e. between axis Y and path R) is greater than the radial distance between axis X and blade 16 (i.e. between axis X and path S), in particular the radial distance between axis Y and slot 17 is double of the radial distance between axis X and blade 16, and due to the fact that the peripheral velocities of blade roller 14 and counterblade roller 15 are substantially equal to one another, when blade 16 will complete a revolution about axis X, slot 17 will have completed less than a revolution about axis Y, in particular half a revolution. Hence, in this condition, blade 16 faces recess 22 and, thus, passes through cutting station T without entering into contact with counterblade roller 15 (FIG. 2*b*).

At its subsequent revolution, blade 16 will face again slot 17, thereby cutting the subsequent predetermined cutting portion of web 3 (FIG. 2*a*).

The operation is repeated for each label 2 to be cut.

Figure 4A:
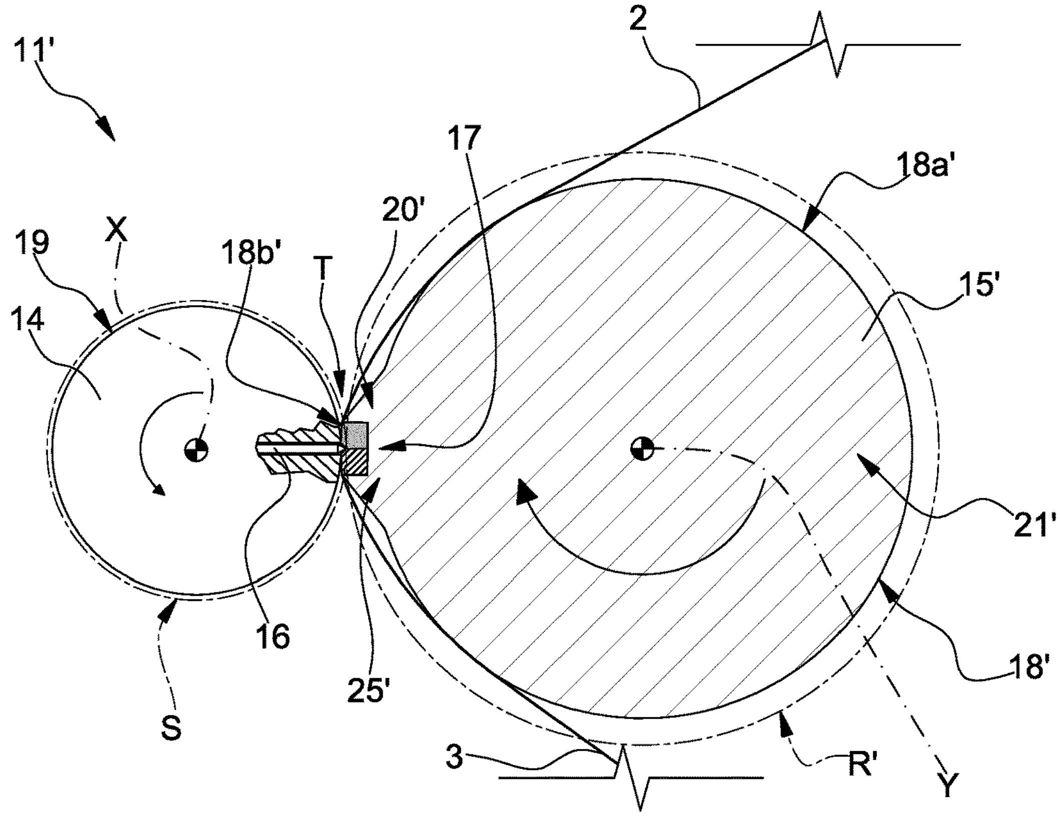
FIGS. 4a-4b are larger-scale, partially sectioned, schematic top views, with parts removed for clarity, of a label cutting device according to an alternative embodiment of the present invention and during different operating conditions.
Figure 4B:
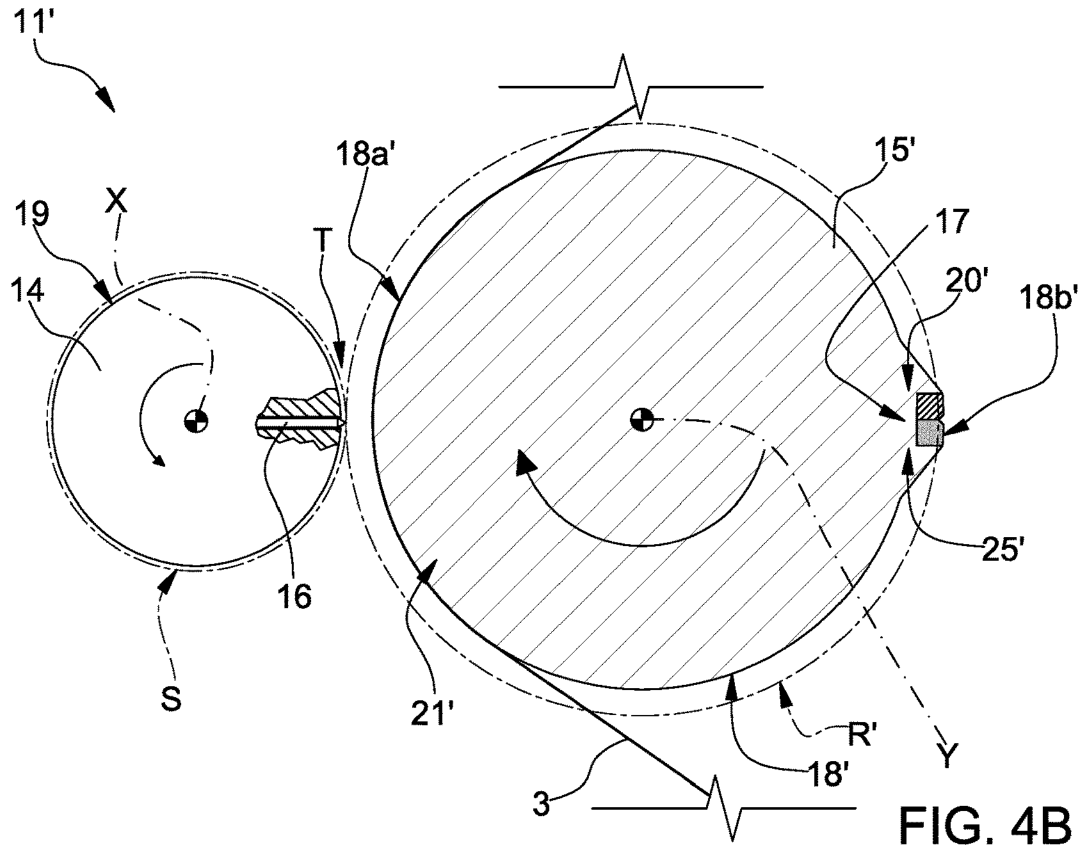

Number 11' in FIGS. 4*a* and 4*b* indicates as a whole a label cutting device according to a second preferred embodiment of the present invention.

Since cutting device 11' is similar, in its structure and function, to cutting device 11, only the differentiating features between them will be described in the following, using the same references and numerals for the remaining equivalent features.

In particular, cutting device 11' differs from cutting device 11 in that it comprises a counterblade roller 15' having a protrusion 25' radially extending outwardly relative to axis Y and defining first portion 20' of counterblade roller 15'.

In practice, protrusion 25' radially extends from second portion 21' of counterblade roller 15', i.e. from outer lateral surface 18'. Second portion 21' is therefore defined by the remaining part of counterblade roller 15' which does not protrude radially from outer lateral surface 18'.

Accordingly, second portion 21' has an outer lateral surface 18*a*', defining a portion of outer lateral surface 18', arranged at a position radially more internal than path R', relative to axis Y.

Protrusion 25' has an outer lateral surface 18*b*' defining the remaining portion of outer lateral surface 18'.

Therefore, protrusion 25' radially extends from outer lateral surface 18*a'*.

Hence, blade 16 faces, in use and at cutting station T, protrusion 25', i.e. first portion 20' thereby engaging slot 17 and cutting web 3 (FIG. 4*a*), and subsequently, at the next one or more revolutions around axis X completed during the same revolution of slot 17 around axis Y, relative to cutting station T, blade 16 faces second portion 21' (FIG. 4*b*).

Thus, in this condition, blade 16 passes through cutting station T without entering into contact with counterblade roller 15'.

According to this preferred embodiment, in which the radial distance between axis Y and slot 17 is double than the radial distance between axis X and blade 16, blade 16 will face, in use and at cutting station T, protrusion 25' (i.e. first portion 20' and slot 17), then second portion 21' and then protrusion 25' again, cyclically and in an alternate manner.

In the example shown, protrusion 25' is defined by a trapezoidal prism integrally protruding from outer lateral surface 18' without solution of continuity, having its minor base (defining outer surface 18*b'*) orthogonal to the radial direction, relative to axis Y, and carrying slot 17 at its minor base.

The above configuration of counterblade roller 15' allows to implement blade rollers 14 comprising two or more blades angularly spaced from one another, due to the fact that, in any case, the contact point between blade 16 and slot 17 projects radially from outer lateral surface 18*a'*, while outer lateral surface 18*a'* is radially more internal than path R', thereby ensuring that no other contact points are present.

Moreover, counterblade roller 15' eliminates the need for providing this latter with two or more recesses 22 appropriately positioned, regardless of the numerical relationship between the radial distance between axis Y and slot 17 and the radial distance between axis X and blade 16.

Figure 5A:
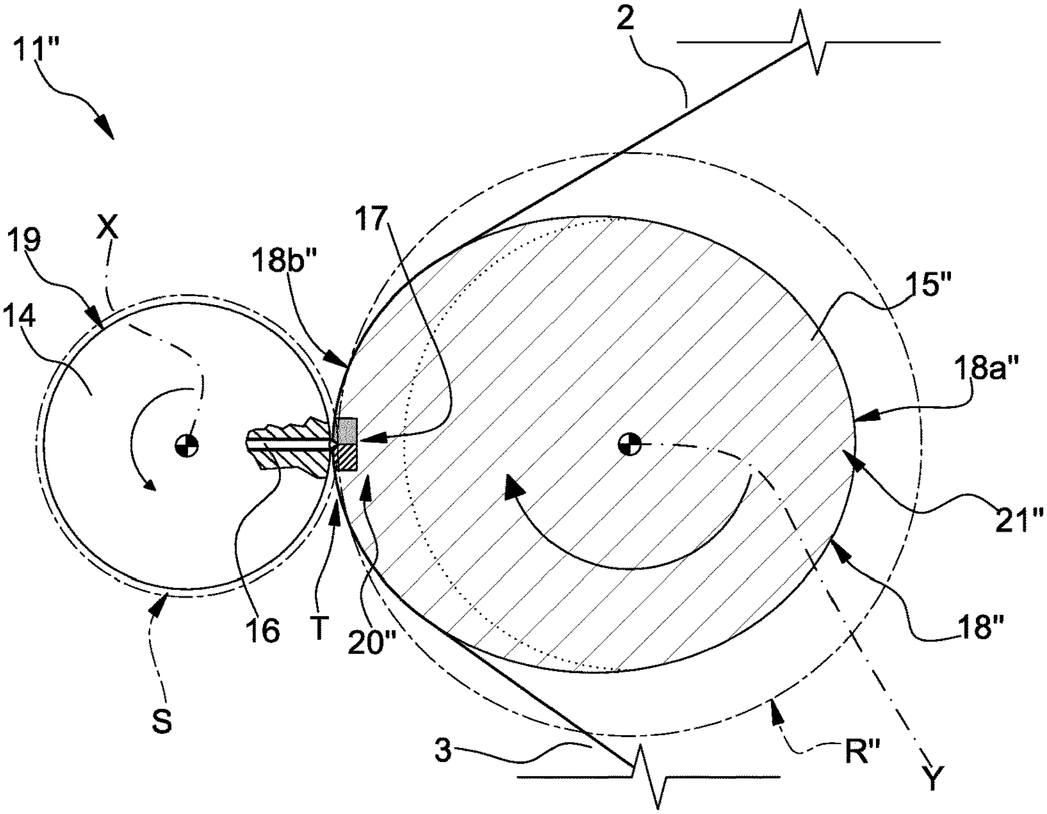
FIGS. 5a-5b are larger-scale, partially sectioned, schematic top views, with parts removed for clarity, of a label cutting device according to a further alternative embodiment of the present invention and during different operating conditions.
Figure 5B:
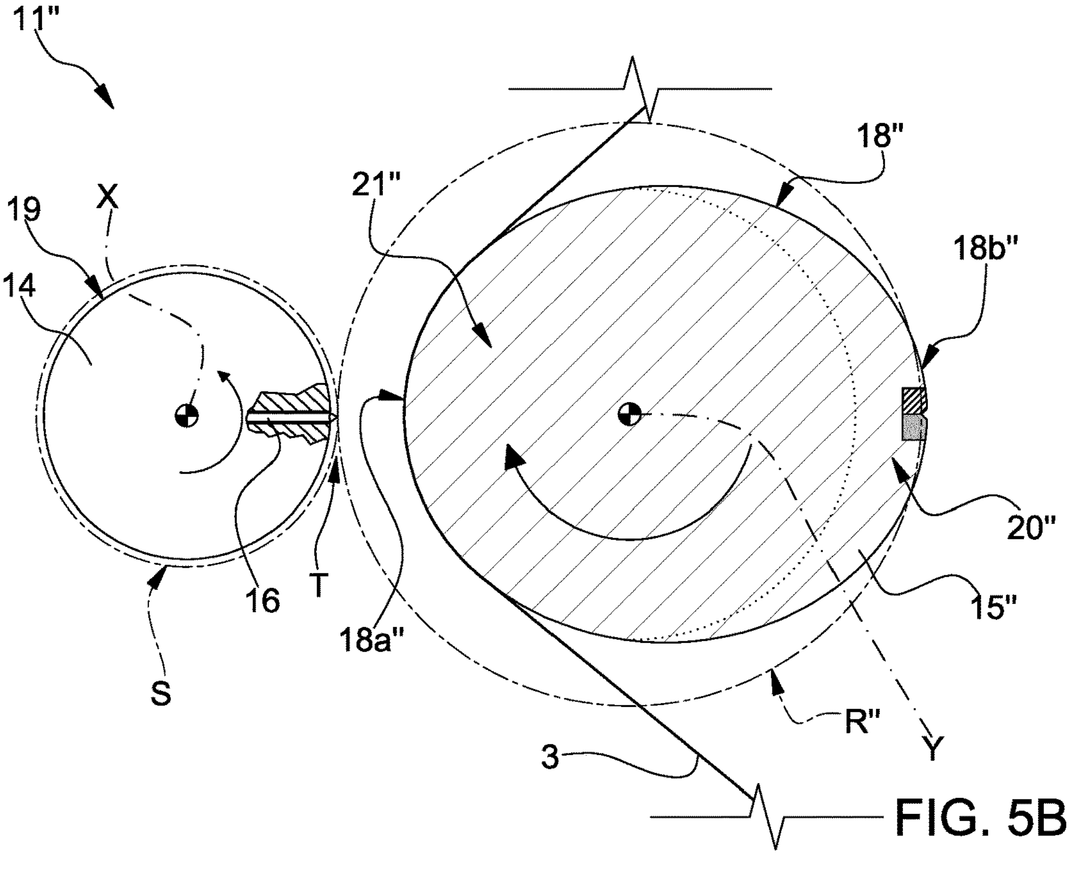

Number 11" in FIGS. 5*a* and 5*b* indicates as a whole a label cutting device according to a third preferred embodiment of the present invention.

Since cutting device 11" is similar, in its structure and function, to cutting devices 11 and 11', only the differentiating features between them will be described in the following, using the same reference and numerals for the remaining equivalent features.

In particular, cutting device 11" differs from cutting devices 11 and 11' in that it comprises a counterblade 15" mounted eccentrically to axis Y, in particular eccentrically rotatable about axis Y, so that the distal portion of counterblade roller 15" with respect to axis Y defines the first portion 20" and the proximal portion of counterblade roller 15" with respect to axis Y defines the second portion 21".

Conveniently, counterblade roller 15" is oval shaped.

Accordingly, second portion 21" has an outer lateral surface 18*a"*, defining a portion of outer lateral surface 18", arranged at a position radially more internal than path R", relative to axis Y.

In light of the above, outer lateral surface 18" defines a smooth, cam-like lateral surface of counterblade roller 15".

Counterblade roller 15" as described in the above configuration ensures a better tensioning of web 3, and, being devoid of any sharp edge, at least limits, preferably prevent, any damage to web 3 during the advancing of web 3 by means of counterblade roller 15".

The advantages of cutting device 11, 11', 11" according to the present invention will be clear from the foregoing description.

In particular, the overall size of cutting device 11, 11', 11" is reduced, since blade roller 14 can have a smaller size than counterblade roller 15, 15', 15" while still allowing the production of labels 2 of the predetermined length.

Moreover, if longer labels 2 need to be produced, is sufficient to appropriately increase the size of counterblade roller 15, 15', 15", so that the circumference defined by path R corresponds to the desired length of each label 2, while maintaining the size of blade roller 14 unchanged.

Furthermore, thanks to the configuration of cutting device 11', blade rollers 14 comprising any number of blades 16 can be implemented. This allows for multi-implementation of the same blade roller 14 with different label cutting devices of the rotary type.

In addition, thanks to the configuration of cutting device 11", a better tensioning of web 3 is ensured, and, being counterblade roller 15" devoid of any sharp edge, any damage to web 3 during the advancing of web 3 is at least limited, preferably prevented.

Clearly, changes may be made to cutting device 11, 11', 11" as described herein without, however, decutting from the scope of protection as defined in the accompanying claims.

The invention claimed is:

1. A cutting device for cutting labels, configured to be applied onto articles adapted to contain a pourable product, from a web of labelling material; said cutting device comprising:

a first rotary member rotatable about a first axis, comprising a blade element and rotating, in use, said blade element around said first axis;

a second rotary member rotatable about a second axis, having a receiving portion on an outer lateral surface of the second rotary member configured to cyclically receive said blade element, rotating, in use, said receiving portion around said second axis, and supporting, in use, said web on said outer lateral surface; and a cutting station at which, cyclically, said blade element engages, in use, said receiving portion to cut said web at predetermined cutting portions thereof covering one at a time said receiving portion, wherein the radial distance between said second axis and said receiving portion is greater than the radial distance between said first axis and said blade element;

wherein said second rotary member comprises:

a first angular portion positioned at a first radial distance from said second axis and comprising said receiving portion and a protrusion (25') defining an outer lateral surface; and a second angular portion angularly spaced from said first angular portion and positioned at a second radial distance from said second axis and defining an outer lateral surface, the first radial distance being greater than the second radial distance; and wherein said blade element is configured to face said first angular portion at said cutting station and said second angular portion towards the second axis, cyclically and alternately to one another, the cutting station being interposed between first rotary member and second rotary member along a line joining the first axis and the second axis.

2. The cutting device as claimed in claim 1, wherein said first rotary member and said second rotary member are controllable so that the peripheral velocity of said blade element, relative to said first axis, is substantially equal to the peripheral velocity of said receiving portion, relative to said second axis, at least at said cutting station.

3. The cutting device as claimed in claim 2, wherein said first rotary member rotates, in use, said blade element along a first annular path extending around said first axis and said second rotary member rotates, in use, said receiving portion along a second annular path extending around said second axis; said first annular path and said second annular path being substantially tangent to one another at said cutting station; and wherein said first rotary member and said second rotary member are controllable so that the peripheral velocity of said blade element along said first annular path is substantially equal to the peripheral velocity of said receiving portion along said second annular path.

4. The cutting device as claimed in claim 2, wherein said first rotary member rotates, in use, said blade element along a first annular path extending around said first axis and said second rotary member rotates, in use, said receiving portion along a second annular path extending around said second axis; said first annular path and said second annular path being substantially tangent to one another at said cutting station; and wherein said second angular portion has an outer lateral surface arranged at a position radially more internal than said second annular path, relative to said second axis.

5. The cutting device as claimed in claim 2, wherein said second rotary member further comprises suction means arranged at its outer lateral surface downstream of said receiving portion, relative to the direction of rotation of the second rotary member about the second axis; said suction means being cyclically activable downstream said cutting station so as to retain, in use, a portion of the label previously cut at the cutting station.

6. The cutting device as claimed in claim 2, wherein said second rotary member further comprises a friction element arranged at its outer lateral surface upstream of said receiving portion, relative to the direction of rotation of the second rotary member about the second axis; said friction element having a friction coefficient higher than the friction coefficient of said outer lateral surface.

7. The cutting device as claimed in claim 1, wherein said first rotary member rotates, in use, said blade element along a first annular path extending around said first axis and said second rotary member rotates, in use, said receiving portion along a second annular path extending around said second axis; said first annular path and said second annular path being substantially tangent to one another at said cutting station; and wherein said first rotary member and said second rotary member are controllable so that the peripheral velocity of said blade element along said first annular path is substantially equal to the peripheral velocity of said receiving portion along said second annular path.

8. The cutting device as claimed in claim 1, wherein said first rotary member rotates, in use, said blade element along a first annular path extending around said first axis and said second rotary member rotates, in use, said receiving portion along a second annular path extending around said second axis; said first annular path and said second annular path being substantially tangent to one another at said cutting station; and wherein said second angular portion has an outer lateral surface arranged at a position radially more internal than said second annular path, relative to said second axis.

9. The cutting device as claimed in claim 1, wherein said second rotary member further comprises suction means arranged at its outer lateral surface downstream of said receiving portion, relative to the direction of rotation of the second rotary member about the second axis; said suction means being cyclically activable downstream said cutting station so as to retain, in use, a portion of the label previously cut at the cutting station.

10. The cutting device as claimed in claim 9, wherein said suction means are arranged adjacent to said receiving portion and are configured to retain an end portion of the label cut at the cutting station.

11. The cutting device as claimed in claim 1, wherein said second rotary member further comprises a friction element arranged at its outer lateral surface upstream of said receiving portion, relative to the direction of rotation of the second rotary member about the second axis; said friction element having a friction coefficient higher than the friction coefficient of said outer lateral surface.

12. The cutting device as claimed in claim 11, wherein said friction element is arranged adjacent to said receiving portion and flush with said outer lateral surface.

13. A labelling machine configured to apply labels obtained from a web of labelling material onto articles designed to contain a pourable product; said machine comprising:

a conveyor device that rotates, in use, said articles along a conveying path;

at least a storage unit configured to store said web of labelling material;

a distribution system configured to unwind said web from said storage unit and feed it along a feeding path;

a cutting device for cutting said labels from said web as claimed in claim 1; and a transfer device of the labels obtained by means of said cutting device, configured to sequentially receive said labels cut by said cutting device and to feed the labels to said conveyor device for their application to respective articles.

14. A cutting device for cutting labels, configured to be applied onto articles adapted to contain a pourable product, from a web of labelling material, the cutting device configured for integration with a labeling module of a labeling machine; said cutting device comprising:

a first rotary member rotatable about a first axis, comprising a blade element and rotating, in use, said blade element around said first axis;

a second rotary member rotatable about a second axis, having a receiving portion on an outer lateral surface of the second rotary member configured to cyclically receive said blade element, rotating, in use, said receiving portion around said second axis, and supporting, in use, said web on said outer lateral surface; and a cutting station at which, cyclically, said blade element engages, in use, said receiving portion to cut said web at predetermined cutting portions thereof covering one at a time said receiving portion;

wherein the radial distance between said second axis and said receiving portion is greater than the radial distance between said first axis and said blade element;

wherein said second rotary member comprises:

a first angular portion positioned at a first radial distance from said second axis and comprising said receiving portion and an outer lateral surface; and a second angular portion angularly spaced from said first angular portion and positioned at a second radial distance from said second axis and comprising an outer lateral surface, the first radial distance being greater than the second radial distance; and wherein the first rotary member and the second rotary member are mounted to the labeling module and rotatable about their respective axis; and wherein said blade element is configured to face said receiving portion and said outer lateral surface of said first angular portion at said cutting station each time the second rotary member has substantially completed a single revolution about the second axis, wherein for each revolution of the second rotary member, the blade element alternates facing said receiving portion and said outer lateral surface at said cutting station and said outer lateral surface of the second angular portion of second rotary member towards the second axis.

15. The cutting device of claim 14, wherein the first rotary member comprises a first angular velocity and a first peripheral velocity and wherein the second rotary member comprises a second angular velocity and a second peripheral velocity, and wherein the first and second peripheral velocities are substantially the same and the first and second angular velocities are not the same.

16. The cutting device of claim 15, wherein the first angular velocity is greater than the second angular velocity.

17. A cutting device for cutting labels, configured to be applied onto articles adapted to contain a pourable product, from a web of labelling material; said cutting device comprising:

a first rotary member rotatable about a first axis, comprising a blade element and rotating, in use, said blade element around said first axis;

a second rotary member rotatable about a second axis, having a receiving portion on an outer lateral surface of the second rotary member configured to cyclically receive said blade element, rotating, in use, said receiving portion around said second axis, and supporting, in use, said web on said outer lateral surface; and a cutting station at which, cyclically, said blade element engages, in use, said receiving portion to cut said web at predetermined cutting portions thereof covering one at a time said receiving portion, wherein the radial distance between said second axis and said receiving portion is greater than the radial distance between said first axis and said blade element;

wherein said second rotary member comprises:

a first angular portion positioned at a first radial distance from said second axis and comprising said receiving portion and a protrusion (25') defining an outer lateral surface; and a second angular portion angularly spaced from said first angular portion and positioned at a second radial distance from said second axis and defining an outer lateral surface, the first radial distance being greater than the second radial distance; and wherein said blade element is configured to face said first angular portion at said cutting station and said second angular portion towards the second axis, cyclically and alternately to one another, the cutting station being interposed between first rotary member and second rotary member along a line joining the first axis and the second axis.

* * * * *